ature for ten hours a black dyestuff
UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING DYESTUFFS.

1,187,614. Specification of Letters Patent. Patented June 20, 1916.

No Drawing. Application filed January 21, 1916. Serial No. 73,276.

*To all whom it may concern:*

Be it known that I, CARLETON ELLIS, a citizen of the United States, and a resident of Montclair, in the county of Essex and State of New Jersey, have invented certain new and useful Improvements in Processes of Making Dyestuffs, of which the following is a specification.

This invention relates to a method of making sulfur blacks and other similar coloring agents or dyestuffs and relates particularly to the preparation of such dyestuffs by the reaction on dinitrophenol or analogous bodies with an alkaline sulfid.

In the preparation of sulfur black use is commonly made of sodium sulfid for the reaction between the various organic raw materials employed. For this purpose in the present instance such a form of sulfid may be employed but it is more particularly the object to employ calcium sulfid and especially the complex form of sulfid of lime and other bodies which is obtained by boiling slaked lime suspended in water with flowers of sulfur. This treatment produces a brownish red liquid containing calcium polysulfid, thiosulfate, sulfite, dithionate, trithionate and the like which have a desirable reducing or reacting effect upon nitro compounds and the like enabling the simple and cheap production of brown, blue or black dyes.

In the preparation of the calcium sulfid compound, one part of lime, with say two parts of sulfur and ten parts of water are boiled for one and one-half hours and the clear liquor decanted after settlement. This will give a solution having a strength of between 25 and 32° Bé. The residuum contains sulfur, unchanged lime and also silica and other non-calcareous material contained in the lime. When using lime containing magnesia care should be taken in boiling the composition as the fumes of hydrogen sulfid are liable to have unpleasant effects. A mixture of dinitrophenol and this polysulfid of lime composition when boiled in a reflux condenser for ten hours affords a black product which may be separated from the solution. By acidification, boiling, and filtering, a dark gray to black powder is obtained which contains more or less free sulfur. This dyestuff dyes cotton black in an alkali sulfid bath.

By treatment of dinitrophenol six parts, slaked lime ten parts, sulfur ten parts and water fifty parts by weight at a boiling temperature for ten hours a black dyestuff is obtained which may be separated from the liquor by acidification. It dyes cotton a good black in alkali sulfid bath.

Seven parts by weight of dinitrochlorbenzol, eighteen parts sulfur and fifteen parts of slaked lime are boiled with one hundred parts of water for about ten hours and the precipitate on acidification collected and washed. This dyestuff dyes cotton a deep brown in a sodium sulfid bath.

Ten parts by weight of dinitrophenol, twenty parts of cresol having a boiling point of about 190° C., and about one hundred parts of complex calcium polysulfid solution 31° Bé. was heated for nine hours at the boiling temperature and the dyestuff thrown down by acidification with hydrochloric acid. It was washed and dried and yielded a black dye which dyed cotton to a very satisfactory shade of black in an alkali bath containing approximately two per cent. of the dyestuff.

The classes of bodies which I prefer to use in this manner in the preparation of the sulfur colors are the dinitrophenols and in particular ortho and paradinitrophenol and the corresponding ortho and paradinitrochlorbenzol. In place of the benzol, the homologues such as toluol, xylol and the like may be used instead in so far as a reactive compound of this character can be obtained. Such dinitro compounds, either pure or associated with mono and trinitro compounds and the like, may be reacted upon, without other addition, with the alkaline sulfid or they may be admixed with phenol, cresol and similar phenolic bodies or other reactive hydroxy bodies and reacted upon with the sulfid material. Cresol is very suitable for this purpose and the ordinary mixed cresols may be used without any special purification.

What I claim is:—

The process of making sulfur black which comprises reacting on a mixture of dinitrophenol and cresol with an alkaline sulfid.

CARLETON ELLIS.

Copies of this patent may be obtained for five cents each, by addressing the "Commissioner of Patents, Washington, D. C."